(12) United States Patent
P J et al.

(10) Patent No.: US 12,476,938 B2
(45) Date of Patent: Nov. 18, 2025

(54) IDENTIFYING RELATIONSHIPS BETWEEN INTELLIGENCE DASHBOARDS

(71) Applicant: Salesforce, Inc., San Francisco, CA (US)

(72) Inventors: Jose Lejin P J, Bengaluru (IN); Ranjith Nath, Kochi (IN); Ramanjaneyulu Y. Talla, Bengaluru (IN); Prabhat Singh, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 35 days.

(21) Appl. No.: 18/242,268

(22) Filed: Sep. 5, 2023

(65) Prior Publication Data

US 2025/0080496 A1    Mar. 6, 2025

(51) Int. Cl.
| | |
|---|---|
| *G06F 15/16* | (2006.01) |
| *H04L 9/40* | (2022.01) |
| *H04L 41/16* | (2022.01) |
| *H04L 41/22* | (2022.01) |

(52) U.S. Cl.
CPC .......... *H04L 63/0263* (2013.01); *H04L 41/16* (2013.01); *H04L 41/22* (2013.01)

(58) Field of Classification Search
CPC ................. H04L 41/16; H04L 41/22
See application file for complete search history.

(56) References Cited

U.S. PATENT DOCUMENTS

| | | | | |
|---|---|---|---|---|
| 10,089,773 | B1* | 10/2018 | Haravu | G09G 5/026 |
| 2008/0034314 | A1* | 2/2008 | Louch | G06F 3/0481 |
| | | | | 715/764 |
| 2011/0231361 | A1* | 9/2011 | Patchava | H04L 63/20 |
| | | | | 707/602 |
| 2017/0126727 | A1* | 5/2017 | Beam | H04L 63/1408 |
| 2021/0152455 | A1* | 5/2021 | Castle | H04L 43/0876 |

* cited by examiner

*Primary Examiner* — Padma Mundur
(74) *Attorney, Agent, or Firm* — Sterne, Kessler, Goldstein & Fox P.L.L.C.

(57) ABSTRACT

First and second dashboards that provide a visual representation of respective intelligence information for a firewall may be generated. An indicator of correspondence between a first data element of the respective intelligence information for the first dashboard and a second data element of the respective intelligence information for the second dashboard may be displayed as an overlay of the first and second dashboards. Additionally, a guidance indicator that indicates an order to access respective values of the first dashboard, the second dashboard, and a third dashboard may be displayed based on an identifier of the first data element mapped to an identifier of the second data element and an identifier of the second data element mapped to an identifier of a third data element for the third dashboard. A summary window that provides a summary of intelligence dashboards of a user interface may be displayed.

20 Claims, 8 Drawing Sheets

IDENTIFYING RELATIONSHIPS BETWEEN INTELLIGENCE DASHBOARDS

BACKGROUND

Intelligence dashboards provide a consolidated, visual representation of firewall-related data, offering real-time monitoring, data visualization, trend analysis, and performance evaluation. Intelligence dashboards aid security teams in understanding the security landscape, detecting threats, and making informed decisions to enhance the overall security of firewall-protected resources, such as web applications. For a firewall, such as a web application firewall (WAF), the amount of intelligence generated may necessitate the use of many intelligence dashboards to capture pertinent information. The overwhelming amount of intelligence dashboards required often renders efforts to identify meaningful relationships between the intelligence dashboards futile. The inability to identify relationships between intelligence dashboards causes analytical confusion.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Provided herein are system, apparatus, device, method, computer program product embodiments, and/or combinations and sub-combinations thereof, for identifying relationships between intelligence dashboards. According to some aspects of this disclosure, a first and second dashboard that each provide a visual representation of respective intelligence information for a firewall identified from raw operational data associated with the firewall may be generated. An identifier of a first data element of the respective intelligence information for the first dashboard may be mapped to an identifier of a second data element of the respective intelligence information for the second dashboard based on a correspondence between the first data element and the second data element. For example, the first data element may be mapped to the identifier of the second data element responsive to a notification of an event for a resource (e.g., a web application, a device, data, etc.) protected by the firewall and associated with the first dashboard. An indicator element that indicates correspondence between the first data element and the second data element may be displayed based on the mapping and as an overlay of at least a portion of the first and second dashboards.

The system, apparatus, device, method, computer program product embodiments, and/or combinations and sub-combinations thereof, for identifying relationships between intelligence dashboards enables users to analyze highly complex dashboards without confusion by visually depicting correspondences between elements of different dashboards. Automatic generation of guidance data, for example, based on a guidance map and linked lists, for resources (e.g., web applications, devices, data, etc.) protected by a firewall enables correspondences between elements of different dashboards to be depicted according to a guidance sequence that informs a user of an order of investigation or analysis for events, anomalies, and/or the like affecting the resources. As described herein, intelligence dashboards configured with guidance indicators helps users easily reference relevant intelligence for events, anomalies, and/or the like affecting the resource while minimizing computation resources, bad usability, and/or the opportunity for error associated with manually investigating complex intelligence dashboards. These and other technological advantages are described herein.

Figure 1:
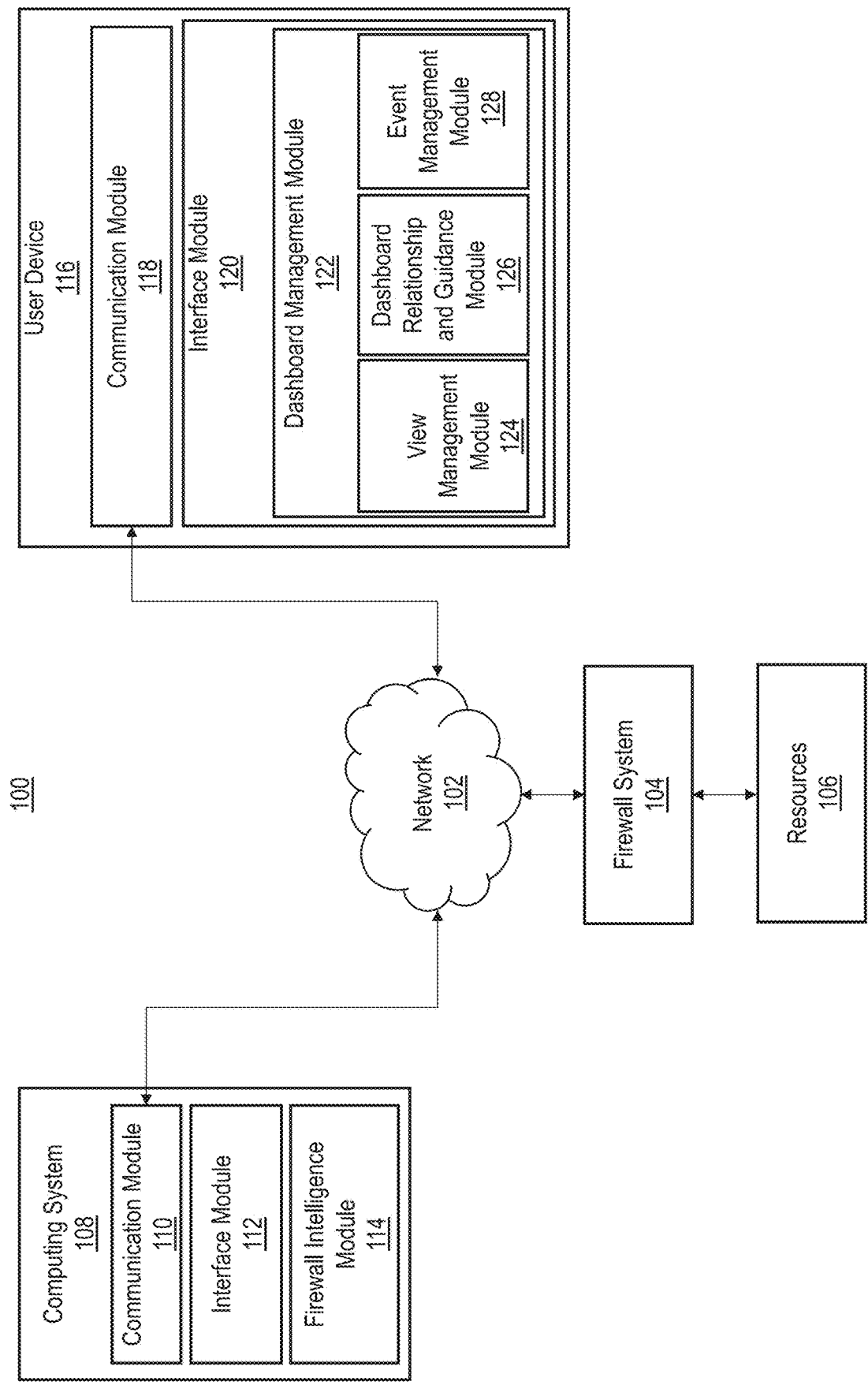
FIG. 1 shows an example system for identifying relationships between intelligence dashboards, according to some aspects of this disclosure.

FIG. 1 shows an example system 100 for identifying relationships between intelligence dashboards. System 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

System 100 may include a network 102. Network 102 may include a packet-switched network (e.g., internet protocol-based network), a non-packet-switched network (e.g., quadrature amplitude modulation-based network), and/or the like. Network 102 may include network adapters, switches, routers, modems, and the like connected through wireless links (e.g., radiofrequency, satellite) and/or physical links (e.g., fiber optic cable, coaxial cable, Ethernet cable, or a combination thereof). Network 102 may include public networks, private networks, wide area networks (e.g., Internet), local area networks, and/or the like. Network 102 may include a content access network, content distribution network, and/or the like. Network 102 may provide and/or support communication from telephone, cellular, modem, and/or other electronic devices to and throughout the system 100. For example, the system 100 may include a user device 116 in communication with, a firewall system 104, resources 106, and a computing system 108 via the network 102.

System 100 may include a firewall system 104. Firewall system 104 may protect resource(s) 106. For example, resource(s) 106 may be associated with a trusted internal network and may be protected by firewall system 104. Resource(s) 106 may include and/or support resources for cloud-based service solutions including, but not limited to, Software as a Service (SaaS), Platform as a Service (PaaS), Infrastructure as a Service (IaaS), Desktop as a Service (DaaS), Security as a Service (SECaaS), Database as a Service (DBaaS), Function as a Service (FaaS), Storage as a Service (STaaS), Network as a Service (NaaS), Communication as a Service (CaaS), and/or the like. Resource(s)

106 may include and/or support network resources (e.g., computing devices, routers, switches, servers, virtual private network components, local area network components, etc.), data and information, business/entity-owned internal systems, Internet of Things (IoT) devices, services (e.g., DNS (Domain Name System) service components, DHCP (Dynamic Host Configuration Protocol) service components, NTP (Network Time Protocol) service components, etc.), applications (e.g., web applications, applications or services running on servers or workstations, web services, etc.), and/or the like.

Firewall system 104 may be a security network system that monitors and controls incoming and outgoing network traffic based on predetermined security rules. It is to be understood that firewall system 104 may be one or a plurality of computing devices and/or the like. Furthermore, firewall system 104 may be implemented as a hardware device, software component, firmware, combinations thereof, and/or the like. Firewall system 104 may be implemented over several devices or entities and serve as a barrier between a trusted internal network and untrusted external networks, such as the Internet supported via network 102.

According to some aspects, firewall system 104 may include a web access firewall (WAF). For example, firewall system 104 may protect web applications, such as resource(s) 106, by filtering and monitoring the traffic between the web applications and the Internet (network 102).

Firewall system 104 may include a storage module (not shown). User-specific rules for users of resource(s) 106 that are protected by firewall system 104 and security rules may be registered and stored by the storage module. User-specific rules may be used to identify a user associated with a request to access, receive, and/or interact with resource(s) 106. Security rules may be used to dictate and/or control how data/information for a specific user or resource is managed by firewall system 104. Security rules may include generic rules which are default rules for users. Generic rules may be customized with user-specific settings. Firewall system 104 may inspect incoming and outgoing traffic (e.g., HTTP traffic) based on user-specific and/or security rules. If an event, such as a malicious attack and/or the like is identified, the firewall system 104 may take appropriate action to report, mitigate, and/or resolve the event.

According to some aspects of this disclosure, computing system 108 may include, for example, a computing device, a smart device, a mobile device, a laptop, a tablet, a display device, or any other device capable of communicating with network 102, firewall system 104, resource(s) 106, user device 116, and/or any other device/component of system 100. Although shown as a single device, it is understood that computing system 108 may represent one or more computing devices. For example, in some scenarios, computing system 108 may represent a web services cluster servicing web service requests including, but not limited to, requests for web pages, API calls, online services, and/or the like.

Computing system 108 may include a communication module 110 that facilitates and/or enables communication with network 102 (e.g., devices, components, and/or systems of the network 102, etc.), resource(s) 106, user device 116, and/or any other device/component of the system 100. For example, communication module 110 may include hardware and/or software to facilitate communication. Communication module 110 may include one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. Communication module 110 may include any hardware and/or software to facilitate communication.

Computing system 108 may include an interface module 112. Interface module 112 enables a user to interact with computing system 108, network 102, resource(s) 106, user device 116, and/or any other device/component of the system 100. Interface module 112 may include a user interface, a web browser, and/or any interface for presenting and/or receiving information to/from a user including, but not limited to, intelligence associated with firewall system 104.

Interface module 112 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, and manipulate, data/information and/or the like used to generate one or more dashboards associated with firewall system 104.

Computing system 108 may include a firewall intelligence module 114. According to some aspects of this disclosure, firewall intelligence module 114 may generate and/or provide configurations such as security rules and/or the like implemented by firewall system 104. For example, configurations may include, but are not limited to, the schema for formatting intelligence and/or analytics data from firewall system 104, the max rate at which data may be received by the firewall from resources, designation of critical metrics, measurements/scales used for metrics, and/or the like.

Firewall intelligence module 114 may monitor and collect intelligence and/or analytics data from firewall system 104. For example, firewall intelligence module 114 may receive real-time or near-real-time data from resource(s) 106, such as network traffic logs, application logs, security event logs, and/or the like. In a scenario where firewall system 104 includes a web application firewall (WAF), monitored and collected intelligence and/or analytics data from firewall system 104 may include, but is not limited to, control plane analytics data (e.g. metrics, threat trend information, threat category information, information detailing the severity of attacks, HTTP methods, etc.), data plane analytics data (e.g., allowed request, blocked request, suspected requests, request rate, attack rate, deployed target entities, etc.), and/or the like.

According to some aspects of this disclosure, intelligence and/or analytics data from firewall system 104 may be in a lightweight data-interchange format including, but not limited to JavaScript Object Notation (JSON) and/or the like. For example, firewall intelligence module 114 may transpose raw data coming from a control plane of firewall system 104 to JSON format.

Firewall intelligence module 114 may include a data store and/or storage module (not shown) that stores intelligence and/or analytics data from firewall system 104. For example, intelligence and/or analytics data from firewall system 104 may be persistently pushed to the data store and/or storage module. For example, intelligence and/or analytics data from firewall system 104 pushed to the data store and/or storage module of firewall intelligence module 114 may stored and/or realized via one or more structured language query (SQL) databases.

Raw data from firewall system 104 that has been transferred to the data store and/or storage module of firewall intelligence module 114 may be asynchronously read and processed. For example, firewall intelligence module 114 may convert the transferred raw data into separate tables and/or data sets. For example, tables and/or data sets may represent all HTTP requests, all the blocked requests, different types of threats (e.g., core injection, cross-site scripting, denial of service, etc.), threat categories (e.g., severity levels, etc.), resource request types, threat sources, and/or the like.

According to some aspects of this disclosure, firewall intelligence module 114 may include an intelligence relationship generator. The intelligence relationship generator may analyze data sets based on raw data from firewall system 104 and build relations between intelligence items. According to some aspects of this disclosure, relations between intelligence items may be generated with coding, such as JavaScript Object Notation (JSON) and/or the like, that uses human-readable text to store and transmit data objects consisting of key-value pairs and arrays.

For example, in a scenario where firewall system 104 is a WAF, relationships between intelligence items identified from raw data may include a situation where a specific HTTP request GET method relates to a certain type of threat category, and that specific threat category relates to a specific threat source agent, and/or the like. Any type of relationship and/or relevancy between intelligence items may be identified and/or generated.

According to some aspects of this disclosure, a user (e.g., a systems administrator, etc.) may define (e.g., via interface module 112, etc.) relationships between intelligence items. For example, user instruction may cause the intelligence relationship generator to communicate with a Scalable Vector Graphics (SVG) controller component of firewall intelligence module 114 to generate entities (e.g. dials, knobs, interactive elements, etc.) for intelligence dashboards. The intelligence relationship generator may manipulate an SVG Document Object Model (DOM) for controlling very specific contents and/or items of an intelligence dashboard.

EXAMPLE OUTPUT 1, below, provides an example output of the intelligence relationship generator of firewall intelligence module 114 that relates items between different intelligence dashboards. EXAMPLE OUTPUT 1 is an example of code for a structure, that when displayed, provides a visual representation of relationships between intelligence dashboard items. EXAMPLE OUTPUT 1 is merely an example and other outputs that relate items between different intelligence dashboards are contemplated according to the system, apparatus, device, method, computer program product embodiments, and/or combinations and sub-combinations thereof, for identifying relationships between intelligence dashboards described herein.

Example Output 1

```
{
    <Dashboard Entity Id>:
    {
        <Dashboard Item id>:
        {
            ItemsRelated:
            [
                {
                    DashboardEntity: <Dashboard Entity Id>,
                    DashboardItem: <Dashboard Item id>
                },
                ...,
                ...,
                ...
            ]
        },
        ...,
        ...,
        ...
        EntitiesRelated:
        [
            {
                DashboardEntity: <Dashboard Entity Id>,
            },
            ...,
            ...,
            ....
        ]
    },
    ...,
    ...,
    ...
}
```

The outermost level of EXAMPLE OUTPUT 1 contains multiple entries representing a specific intelligence dashboard. Within each dashboard entry, there are individual items represented by their unique item IDs. Each item has two properties. The property "ItemsRelated" holds an array of objects representing other items related to the current item within the same dashboard. Each related item is represented by the properties "DashboardEntity" and "DashboardItem." The properties "DashboardEntity" and "DashboardItem" contain the IDs of the corresponding dashboard entity and item in that dashboard entity. At the end of each dashboard entry, there is an "EntitiesRelated" property. The "EntitiesRelated" property holds an array of objects representing other dashboard entities related to the current dashboard. Each related entity is represented by the property "DashboardEntity." The "DashboardEntity" property contains the ID of the corresponding dashboard entity.

As used in EXAMPLE OUTPUT 1, "<Dashboard Entity Id>" corresponds to a dashboard entity (e.g., a dial, a pie chart, a knob, an intelligence element, an interactive element, etc.) in a dashboard. "<Dashboard Entity Id>" may be used as a Scalable Vector Graphics (SVG) root id. "<Dashboard Item id>" corresponds to a specific field value inside the property "Dashboard Entity." For example, "<Dashboard Item id>" may correspond to a dashboard entity ("Dashboard Entity") displayed as a dial of a "Threat Category" dashboard that represents a denial-of-service value and/or the like.

According to some aspects of this disclosure, firewall intelligence module 114 may include one or more predictive models (e.g., one or more trained machine learning models, etc.) that automatically identify relevancy between intelligence items identified from raw data transferred from firewall system 104. According to some aspects of this disclosure, raw operational data from firewall system 104 may be input into a predictive model trained to identify types of dashboards from raw data. The predictive models may provide firewall intelligence module 114 indication of types of dashboards (e.g., threat category dashboards, threat severity dashboards, attack method dashboards, threat source dashboards, dashboards that indicate events affecting a resource, etc.) to be generated from the raw operational data. The raw operational data may be transformed to be represented by different intelligence dashboards. By employing machine learning techniques, predictive models of firewall intelligence module 114 enhance the efficiency and accuracy of security analysis, enabling prompt identification of potential threats and vulnerabilities.

Training predictive models may include firewall intelligence module 114 applying feature extraction algorithms to preprocess intelligence and/or analytics data from firewall system 104, and transforming it into a suitable format for analysis. Firewall intelligence module 114 may clean, normalize, and enrich the intelligence and/or analytics data to ensure consistency and reliability.

To generate training data for the predictive models, firewall intelligence module 114 may utilize a labeled training dataset comprising historical data, which is manually annotated by security experts (or automatically labeled by other trained predictive models trained to label training data) to identify relevant and irrelevant items. The training dataset serves as a basis for training the predictive models to make accurate predictions when identifying relationships between intelligence items. According to some aspects of this disclosure, to train and validate predictive models to relationships between intelligence items, firewall intelligence module 114 may employ a supervised learning approach using various machine learning algorithms, such as decision trees, random forests, deep neural networks, and/or the like. The predictive modes model may learn from the labeled training dataset and iteratively adjust parameters to optimize performance. Cross-validation techniques may be applied to assess and validate predictive model accuracy.

Trained predictive models of firewall intelligence module 114 may predict the relevancy of intelligence items used to generate intelligence dashboards by considering various factors including the severity of security events, network traffic patterns, contextual information related to specific applications (or devices) and their associated vulnerabilities, and/or the like. Predictive models may be used to generate mappings between dashboard item identifiers (e.g., a Dashboard Item id, etc.). For example, predictive models may be used to generate mappings between an identifier of a first data element (e.g., dashboard item, etc.) of the respective intelligence information (e.g., data value representing a specific context, etc.) for the first dashboard to an identifier of a second data element of the respective intelligence information for the second dashboard based on a correspondence between the first data element and the second data element.

Mappings that identify correspondences between dashboard items and/or data elements of different dashboards may be stored and used by the intelligence relationship generator of firewall intelligence module 114. For example, mappings between dashboard item identifiers may be stored and extracted by scanning any intelligence dashboards (SVGs) generated since the intelligence dashboards have unique identifiers in the SVG Document Object Model (DOM) internal elements.

User device 116 may view, access, manipulate, and/or the like one or more intelligence dashboards associated with firewall system 104 based on data/information received from firewall intelligence module 114. For example, firewall intelligence module 114 may provide intelligence dashboards to user device 116 delivered as a web application and/or the like.

User device 116 may include, for example, a smart device, a mobile device, a laptop, a tablet, a display device, a computing device, or any other device capable of requesting, accessing, and/or the like resource(s) 106. User device 116 may include a communication module 118 that facilitates and/or enables communication with network 102 (e.g., devices, components, and/or systems of the network 102, etc.), resource(s) 106, computing system 108, and/or any other device/component of the system 100. For example, communication module 118 may include hardware and/or software to facilitate communication. Communication module 118 may include one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. Communication module 118 may include any hardware and/or software to facilitate communication.

User device 116 may include an interface module 120. Interface module 120 enables a user to interact with user device 116, network 102, resource(s) 106, computing system 108, and/or any other device/component of the system 100. Interface module 120 may include any interface for presenting and/or receiving information to/from a user including, but not limited to, intelligence dashboards associated with firewall system 104.

Interface module 120 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, manipulate, and/or the like one or more dashboards associated with firewall system 104 and displayed by a dashboard management module 122 of interface module 120. According to some aspects, interaction with the input devices and/or components may enable a user to manipulate and/or interact with components of a user interface, for example, such as one or more dashboards, interactive elements, windows (e.g., dashboard summary windows, etc.), and/or the like.

Interface module 120 may include the dashboard management module 122. Dashboard management module 122 enables a user to view, access, and/or manipulate intelligence dashboards, web application documentation and/or content, application pages, webpages, and/or the like. For example, Dashboard management module 122 may be used to access and/or view intelligence dashboards that provide intelligence for viewing firewall protection detail of resource(s) 106 protected by firewall system 104. For example, in a scenario where the firewall system 104 includes a web application firewall (WAF), the dashboard management module 122 may be used to access and/or view dashboards related to traffic overviews, threat trends and summaries, threat categories, severity of attacks, HTTP methods, blocked request, security rule triggers, incident/event reports, response times, policy violations, encrypted traffic data, API security, bot traffic, and/or the like.

Dashboard management module 122 may include, but is not limited to, a web browser, a user interface, and/or the like. Dashboard management module 122 may access, process, and view dashboards, user interfaces, information, web forms, web pages, and/or applications available to it from the system 100 via the network 102. Dashboard management module 122 may request/query and/or send/provide various files from a local source and/or a remote source, such as resource(s) 106, firewall wall system 104, computing system 108, and/or the like. Dashboard management module 122 may communicate with firewall intelligence module 114 to access, display, and/or manipulate intelligence dashboards and identify relationships between the intelligence dashboards.

Rendering of intelligence dashboards and indicator elements to identify relationships between the intelligence dashboards may be realized using SVG rendering and an SVG library associated with and/or accessible by firewall intelligence module 114. Computing system 108 may include and/or be configured with a representational state transfer (REST) API that facilitates RESTful services, such as interactions and data transferal, between firewall intelligence module 114 of computing system 108 and dashboard management module 122 of user device 116. Accordingly, computing system 108 may provide any information related to firewall system 104 to computing system 108.

For example, firewall intelligence module 114 of computing system 108 may send intelligence dashboards and associated components (e.g., modules to generate summary, relationship, and guidance elements for intelligence dashboards, etc.) to user device 116 (e.g., dashboard management module 122, etc.) as JSON format and SVG data.

According to some aspects of this disclosure, when user device 116 loads a web application and/or the like to the dashboard management module 122 to present and/or display intelligence dashboards, user device 116 may also receive and load a view management module 124, a dashboard relationship and guidance module 126, and an event management module 128. For example, user device 116 may implement view management module 124, dashboard relationship and guidance module 126, and event management module 128 via JavaScript, Cascading Style Sheets (CSS), Hypertext Markup Language (HTML), and/or the like.

View management module 124 may detect different dashboard entities in intelligence dashboards based on the identifier pattern of the root elements of the intelligence dashboards and the root elements of its entities. Once different dashboard entities are detected, view management module 124 coordinates all other operations and user interface design renderings. For example, view management module 124 may cause highlighting data elements (e.g., data value, etc.) and/or dashboard items (e.g., dial, knobs, etc.) inside of a displayed intelligence dashboard based on user interaction (e.g., whenever a user uses a mouse and/or the like to hover over or focus on a data element and/or dashboard item, etc.).

According to some aspects of this disclosure, view management module 124 may generate, render, and/or cause to be displayed a header, for example, overlaying a location/portion of a user interface displaying intelligence dashboards. As described, view management module 124 may communicate with firewall intelligence module 114 to receive data/information used to generate, render, and/or cause to be displayed a header overlaying a location/portion of a user interface displaying intelligence dashboards. The header may include interactive elements including, but not limited to: notification elements to provide notification of events associated with firewall system 104 and/or affecting resource(s) 106, a summary element that upon interaction provides a summary of intelligence dashboards displayed by a user interface, a relationship element that upon interaction causes a visual indication of relationships between data elements and/or dashboard items of different intelligence dashboards to be displayed, a guidance element that upon interaction causes display of guidance indicator that indicate an order to access different data element of different intelligence dashboards, and/or the like.

Figure 2A:
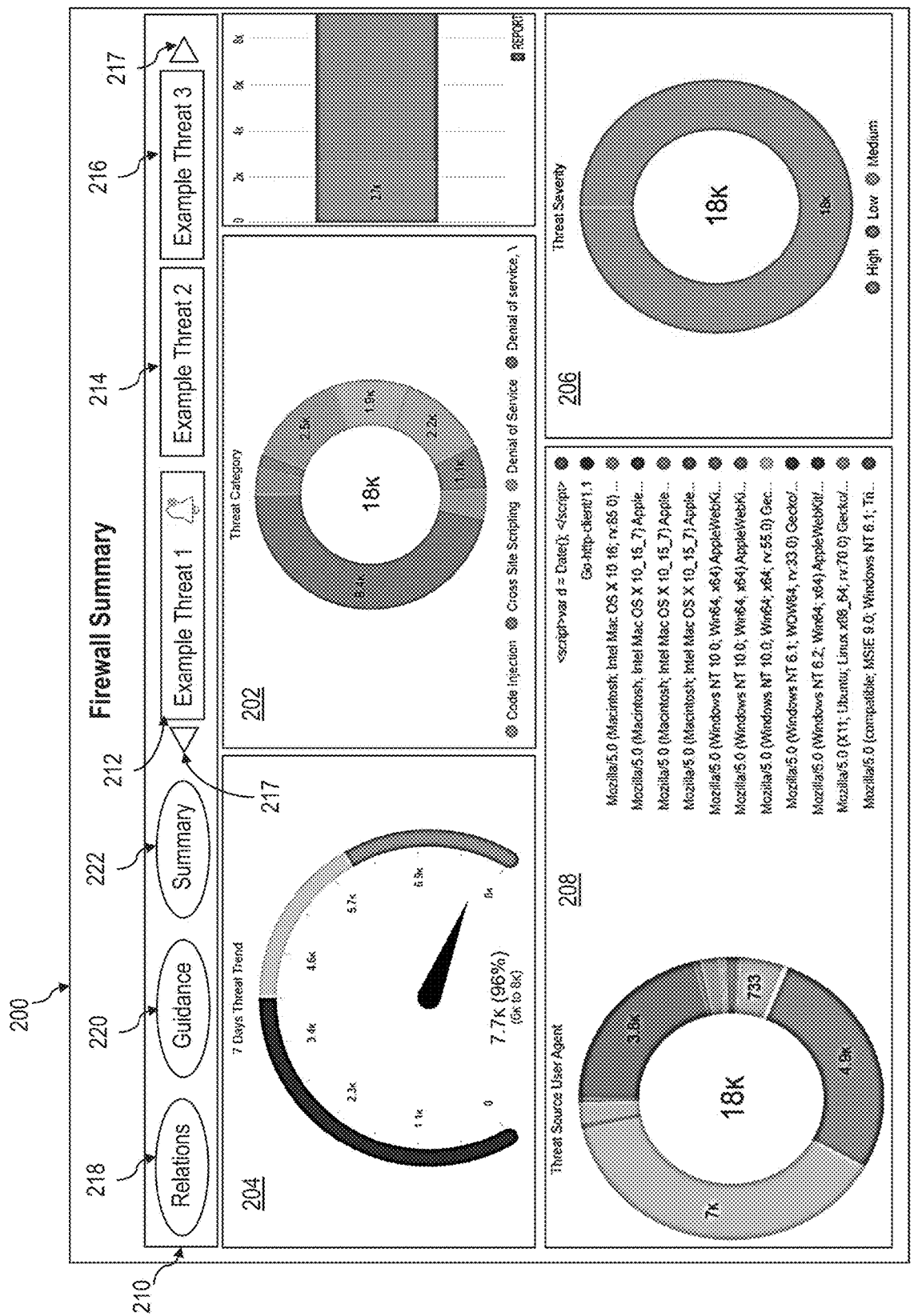
FIG. 2A shows an example of a user interface, according to some aspects of this disclosure.

FIG. 2A shows an example of a user interface 200 accessed and/or displayed by the interface module 120. The user interface 200 may present and/or display intelligence dashboards 202-208. User interface 200 provides an organized and consolidated view of firewall-related information. Intelligence dashboards 202-208 enable administrators to quickly assess the security posture of firewall system 104, identify potential threats or anomalies, and take appropriate actions to maintain security. Intelligence dashboards 202-208 simplify the monitoring and management of operations of firewall system 104, enhancing the efficiency and effectiveness of network security management.

Returning to FIG. 1, as described, dashboard management module of user device 118 communicates with firewall intelligence module 114 to obtain information used to display intelligence dashboards. Additionally, dashboard management module 122 communicates with firewall intelligence module 114 to obtain information used to identify relationships between intelligence dashboards.

For example, firewall intelligence module 114 may access guidance maps which are mappings that identify correspondences between dashboard items and/or data elements of different dashboards stored by the intelligence relationship generator of firewall intelligence module 114. Firewall intelligence module 114 may access the raw data from firewall system 104 and stored correspondences between dashboard items and/or data elements of different dashboards to build relationship elements and guidance elements for user device 116 when displaying intelligence dashboards.

Figure 2B:
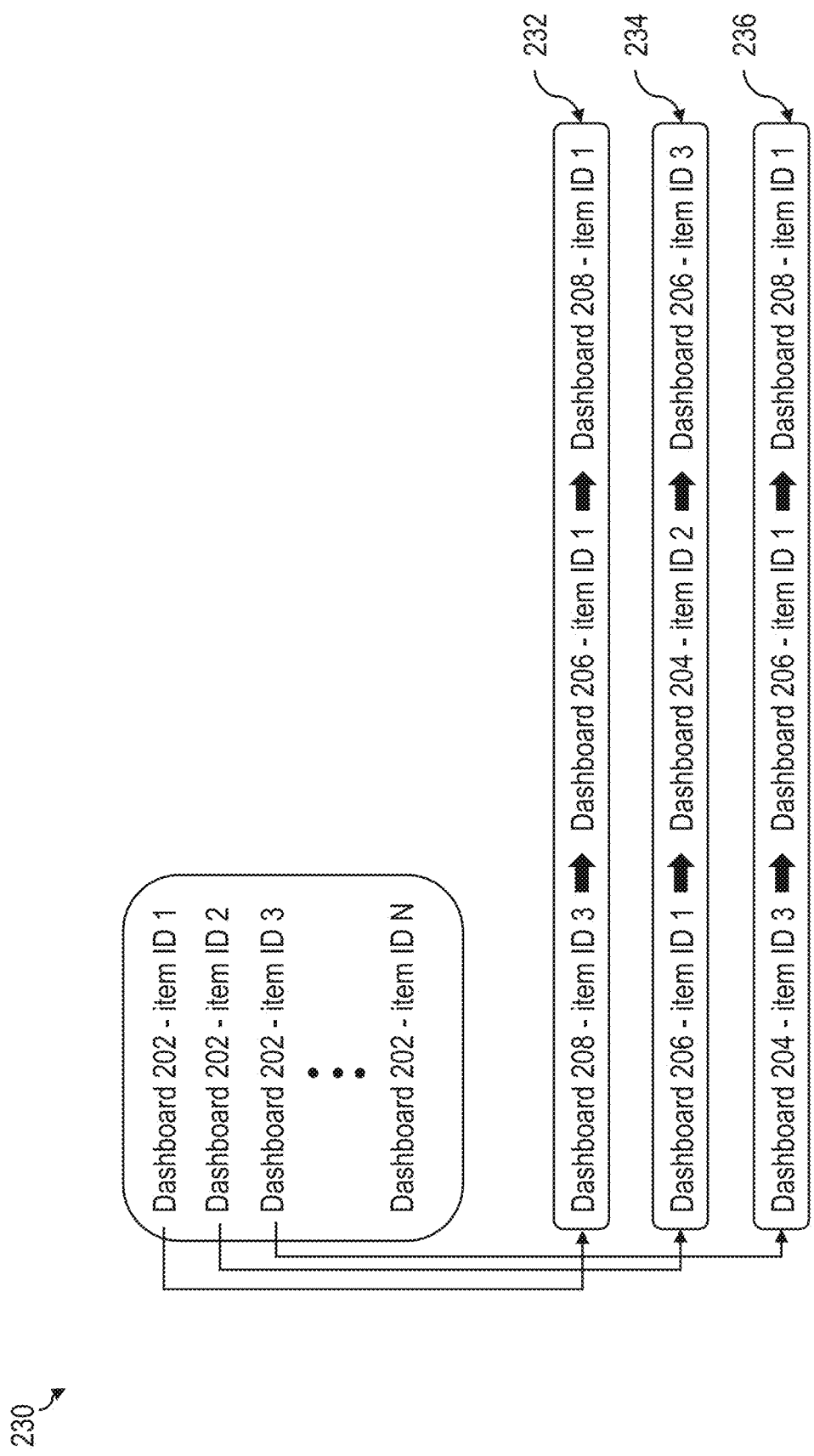
FIG. 2B shows an example of a guidance map used for elements of a user interface, according to some aspects of this disclosure.

FIG. 2B shows an example guidance map 230 that identifies correspondences (e.g., linked list, etc.) between dashboard items and/or data elements of intelligence dashboards 202-208 of user interface 200 (FIG. 2A). For example, as shown, item ID 1 of intelligence dashboard 202 is mapped to a linked list 232. Linked list 232 indicates an ordered correspondence (e.g., an investigative order for an event, etc.) between dashboard items and/or data elements of intelligence dashboards 206 and 208. Item ID 2 of intelligence dashboard 202 is mapped to a linked list 234. Linked list 234 indicates an ordered correspondence between dashboard items and/or data elements of intelligence dashboards 204 and 206. Item ID 3 of intelligence dashboard 202 is mapped to a linked list 236. Linked list 236 indicates an ordered correspondence between dashboard items and/or data elements of intelligence dashboards 204, 206, and 208.

Returning to FIG. 2A, as described, view management module 124 may generate, render, and/or cause to be displayed header 210. View management module 124 may generate, render, and/or cause to be displayed header 210 based on header configuration data/information received from computing system 108 whenever dashboard management module 122 generates, launches, and/or causes user interface 200 to be displayed.

Header 210 may include interactive elements. For example, header 210 may include notification elements 212-216 to provide notification of events associated with firewall system 104 and/or affecting resource(s) 106. Notification elements 212-216 displayed responsive to events affecting resource(s) 106 may be facilitated via event management module 128. Event management module 128 may generate notification elements 212-216 based on firewall intelligence module 114 monitoring firewall system 104. According to some aspects of this disclosure, view management module 124 may generate, render, and/or present scrollable elements 217 for header 210. For example, view management module 124 may generate scrollable elements 217 for header 210 based on the amount of notification elements (e.g., notification elements 212-216, etc.) exceeding a notification element display threshold for header 210. The scrollable elements 217 may include, for example, a directional arrow(s), a scroll bar, a graphical indicator, and/or the like. View management module 124 causes notification elements and/or overflow notification elements (e.g., notification elements that do not fit within a viewable area, etc.) to be displayed within header 210 based on an interaction with the scrollable elements 217.

According to some aspects of this disclosure, when a user interacts, clicks on, and/or selects a notification (e.g., notification elements 212-216, etc.), event management module 128 auto renders connectors and/or indicator elements to all related data elements and/or dashboard items of intelligence dashboards 202-208.

According to some aspects of this disclosure, header 210 may include a relationship element 218 is an interactive element that upon interaction causes a visual indication of relationships between data elements and/or dashboard items of intelligence dashboards 202-208 to be displayed. According to some aspects of this disclosure, relationship element 218 is enabled when a user selects a data element and/or dashboard item within an intelligence dashboard.

Figure 2C:
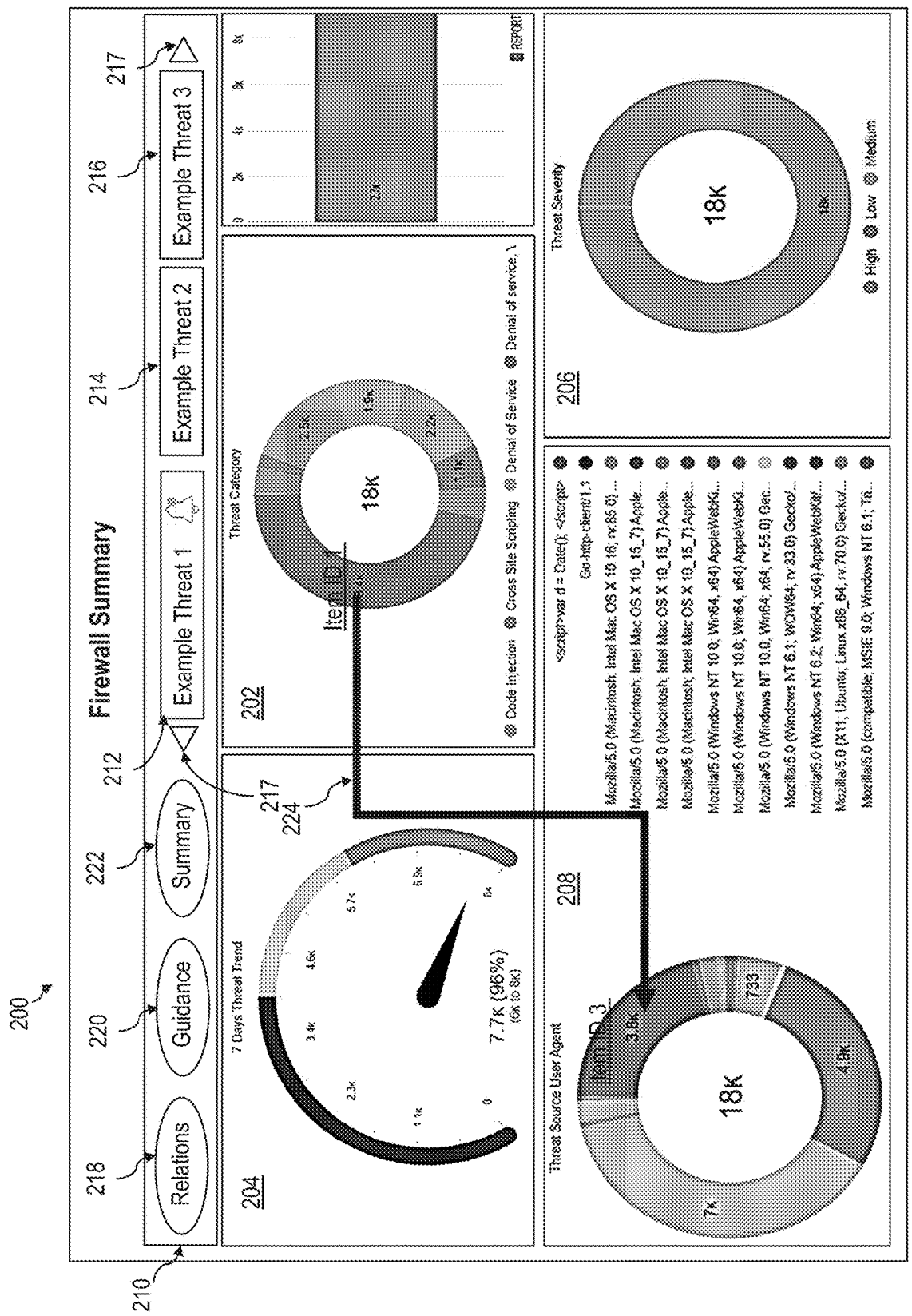
FIG. 2C shows an example of a user interface, according to some aspects of this disclosure.

FIG. 2C shows an example of user interface 200 where relationship element 218 has been interacted. Relationship element 218 and relations displayed based on interaction with relationship element 218 may be facilitated via dashboard relationship and guidance module 126.

According to some aspects of this disclosure, a user may select a specific value or portion within an intelligence dashboard. For example, a user may select item ID 1 of intelligence dashboard 202 and then select relationship element 218 to display relations between item ID 1 to specific values or portions within other intelligence dashboards, such as item ID 3 of intelligence dashboard 208. For example, the relationship between item ID 1 of intelligence dashboard 202 to item ID 3 of intelligence dashboard 208 may be displayed via indicator element 224. Indicator element 224 may be displayed as an overlay of at least a portion of intelligence dashboard 202 and at least a portion of intelligence dashboard 208.

According to some aspects of this disclosure, dashboard relationship and guidance module 126 may adjust adjusting a position of at least a portion of indicator element 224 to correspond to a changed position intelligence dashboard 202 and/or intelligence dashboard 208. For example, dashboard relationship and guidance module 126 may use indications from event listeners to adjust and/or correct an angle of connection between a data element and/or dashboard item of a first intelligence dashboard and a data element and/or dashboard item of a second intelligence dashboard caused by a repositioning of either the first or second intelligence dashboard. According to some aspects of this disclosure, indicator element 224 may disappear and/or no longer be displayed when an intelligence dashboard to which it relates is not selected and/or interacted.

According to some aspects of this disclosure, header 210 may include a guidance element 220. Guidance element 220 is an interactive element that upon interaction causes a display of guidance indicators that indicate an order to access different data elements of intelligence dashboards 202-208.

Figure 2D:
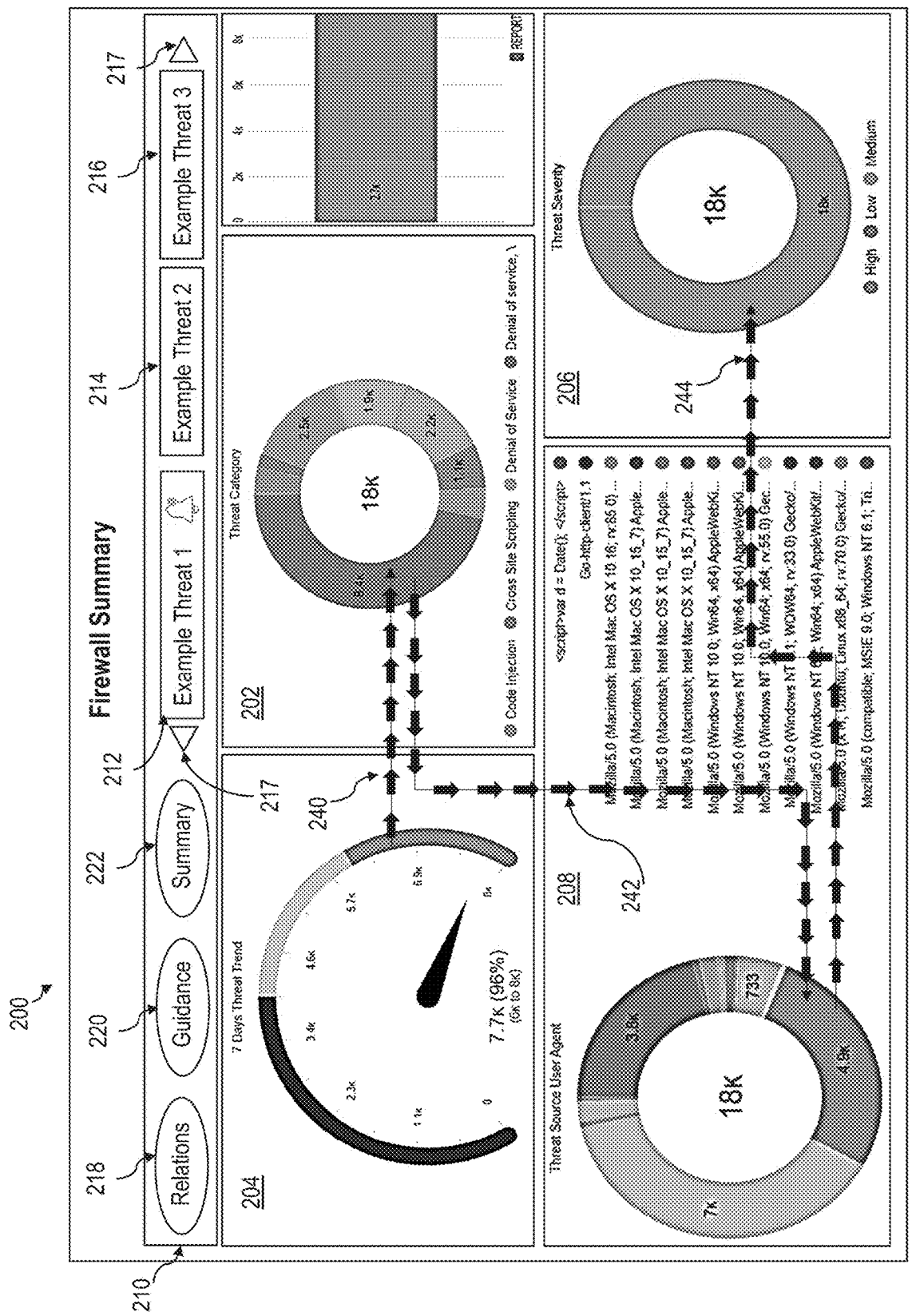
FIG. 2D shows an example of a user interface, according to some aspects of this disclosure.

FIG. 2D shows an example of user interface 202 where an interaction with guidance element 220 has occurred. Guidance element 220 and guidance indicators 240-244 displayed based on interaction with guidance element 220 may be facilitated via dashboard relationship and guidance module 126.

According to some aspects of this disclosure, when a user interacts, clicks on, and/or selects a specific data element and/or dashboard item (e.g., a dashboard entity, etc.) inside of an intelligence dashboard and then interacts, clicks on, and/or selects guidance element 220, guidance indicators 240-244 are displayed to visually guide the user through an investigation sequence related to the specific data element and/or dashboard item. The investigation sequence may correspond to a guidance map (e.g., guidance map 230 of FIG. 2B, etc.) stored by firewall intelligence module 114. The order of the investigation sequence is indicated by directional arrows of the guidance indicators 240-244.

Guidance indicators 240-244 indicate an order to access different data elements of intelligence dashboards 202-208 responsive to an event notification indicated by one of notification elements 212-216. For example, the order and/or investigative sequence may assist a user to identify which data element of intelligence dashboard 202 corresponds to notification element 212, which data element of intelligence dashboard 204 corresponds to the data element of intelligence dashboard 202, and so forth. Guidance indicators 240-244 may be displayed in sequence. For example, when a user interacts, clicks on, and/or selects a data element and/or dashboard item of intelligence dashboard 204, guidance indicator 240 may be displayed. Guidance indicator 240 may disappear or no longer be displayed when the user interacts, clicks on, and/or selects a data element and/or dashboard item of intelligence dashboard 202 and guidance indicator 242 may be displayed. Guidance indicator 242 may disappear or no longer be displayed when the user interacts, clicks on, and/or selects a data element and/or dashboard item of intelligence dashboard 208 and guidance indicator 244 may be displayed.

Summary element 222 is an interactive element that upon interaction causes display of a summary window. The summary window may provide a summary of intelligence dashboards displayed by a user interface 200.

Figure 2E:
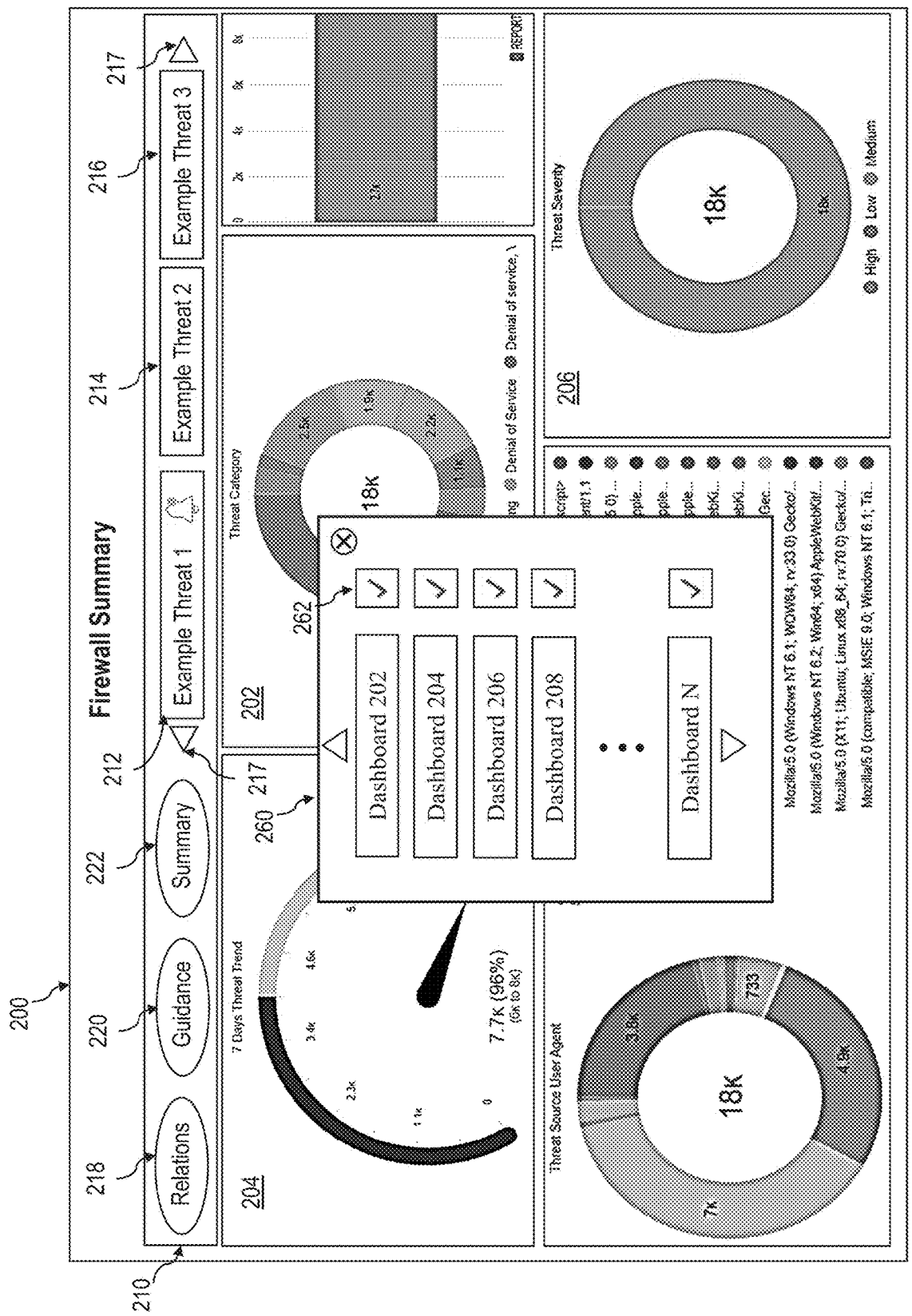
FIG. 2E shows an example of a user interface, according to some aspects of this disclosure.

FIG. 2E shows an example of user interface 200 where summary element 222 has been interacted. According to some aspects of this disclosure, when a user interacts, clicks on, and/or selects a summary element 222, dashboard relationship and guidance module 126 renders summary window 260. As shown, summary window 260 indicates each intelligence dashboard that is displayed by user interface 200. According to some aspects of this disclosure, summary window 260 may include interactive elements, such as interactive element 262, that when interacted with cause intelligence dashboards to be added or removed (e.g., hidden from display) from user interface 200. According to some aspects of this disclosure, summary window 260 may include interactive elements (not shown) that when interacted with facilitate similar functions as relationship element 218 and/or guidance element 220 for each intelligence dashboard represented by summary window 260.

Figure 3:
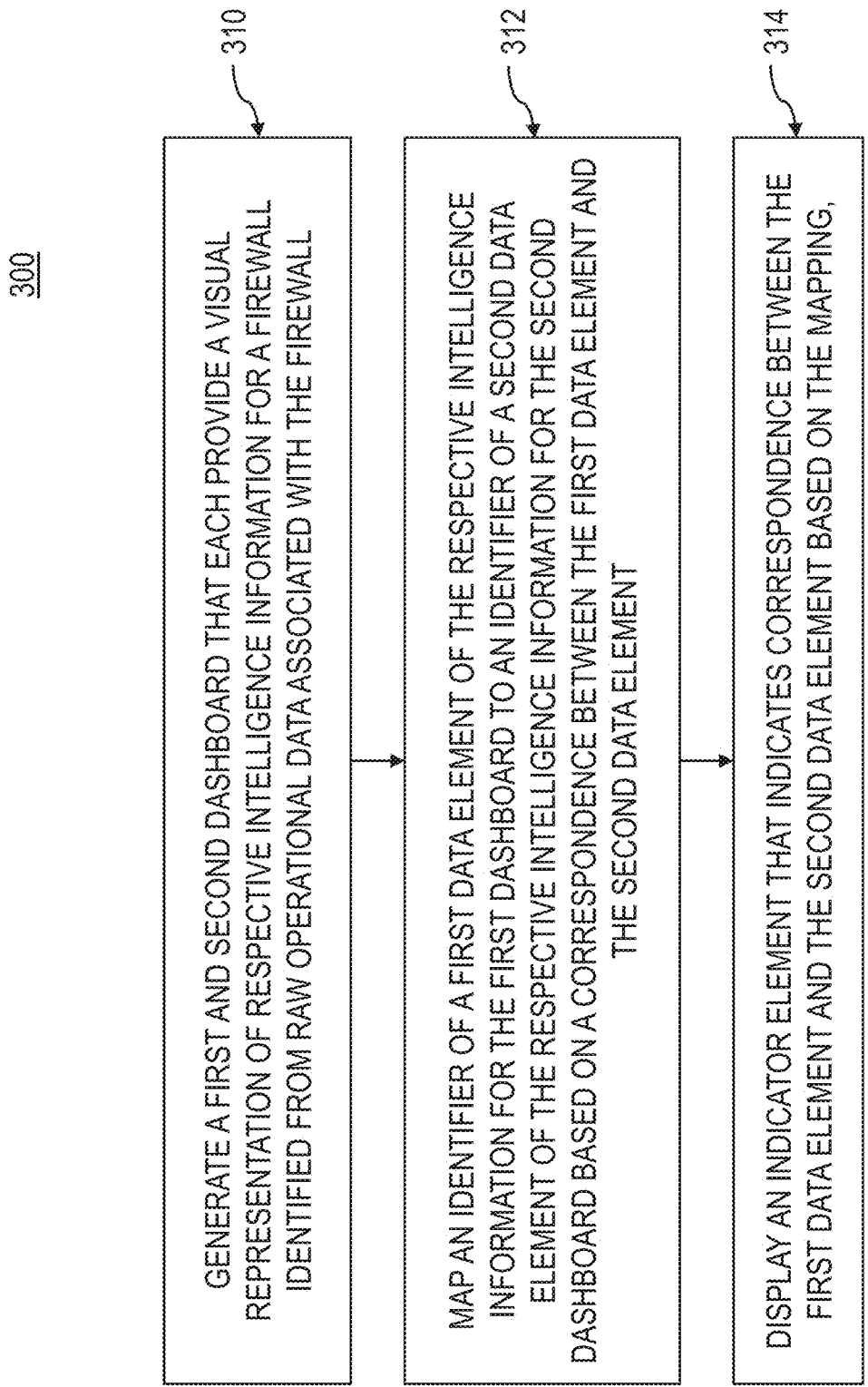
FIG. 3 shows a flowchart of an example method for identifying relationships between intelligence dashboards, according to some aspects of this disclosure.

FIG. 3 shows a flowchart of an example method 300 for identifying relationships between intelligence dashboards, according to some aspects. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1-2E. However, method 300 is not limited to the aspects of those figures.

In 310, user device 116 generates a first and second dashboard that each provides a visual representation of respective intelligence information for a firewall identified from raw operational data associated with the firewall. For example, in a scenario where the firewall is a web application firewall, the raw operational data may include, but is not limited to, indications of HTTP requests received by the firewall system 104, all requests for resources blocked by firewall system 104, indications of different types of threats (e.g., core injection, cross-site scripting, denial of service, etc.)

The raw operational data may be transformed to a common format (e.g. JSON format, etc.). Intelligence information may be extracted from the transformed operational data to generate relevant intelligence dashboards. For example, the transformed operational data may be placed into various data sets including, but not limited to, data set representing threat categories, HTTP Request types, threat source agents, and/or the like. The data sets may be used to generate the first and second dashboards.

According to some aspects of this disclosure, generating the first dashboard and the second dashboard may include receiving an indication of one or more types of dashboards for the raw operational data. Receiving the indication of one or more types of dashboards for the raw operational data may be based on the raw operational data input into a predictive model trained to identify types of dashboards from raw data. The first dashboard and the second dashboard may be generated based at least in part on one or more portions of the raw operational data transformed to respective formats for the one or more types of dashboards indicated by the predictive model.

In 312, user device 116 maps (or accesses a mapping) an identifier of a first data element of the respective intelligence information for the first dashboard to an identifier of a second data element of the respective intelligence information for the second dashboard. The mapping may be based on a correspondence between the first data element and the second data element.

According to some aspects of this disclosure, the mapping of the identifier of the first data element to the identifier of the second data element may be responsive to a notification of an event for a resource protected by the firewall and associated with the first dashboard. The correspondence between the first data element and the second data element may be based on factors including, but not limited to, a value for the first data element and a value for the second data element, a correspondence between a type of security event (e.g., allowed request, blocked request, suspected requests, request rate, attack rate, deployed target entities, etc.) for a resource associated with the firewall and a source of the security event, a correspondence between a type of the resource and a type of event for the resource, and/or the like.

In 314, user device 116 displays an indicator element that indicates correspondence between the first data element and the second data element based on the mapping. According to some aspects of this disclosure, the indicator element may be displayed as an overlay of at least a portion of the first dashboard and at least a portion of the second dashboard.

According to some aspects of this disclosure, method 300 may further include user device 116 displaying a guidance indicator that indicates an order to access the respective values of the first dashboard, the second dashboard, and a third dashboard. For example, user device 116 may display the guidance indicator that indicates an order to access respective values of the first dashboard, the second dashboard, and the third dashboard based on the identifier of the second data element mapped to an identifier of a third data element of the respective intelligence information for the third dashboard.

According to some aspects of this disclosure, method 300 may further include adjusting a position of at least a portion of the indicator element to correspond to the changed position of at least one of the first dashboard or the second dashboard. For example, the position of at least a portion of the indicator element may be adjusted to correspond to a changed position of at least one of the first dashboard or the second dashboard.

Figure 4:
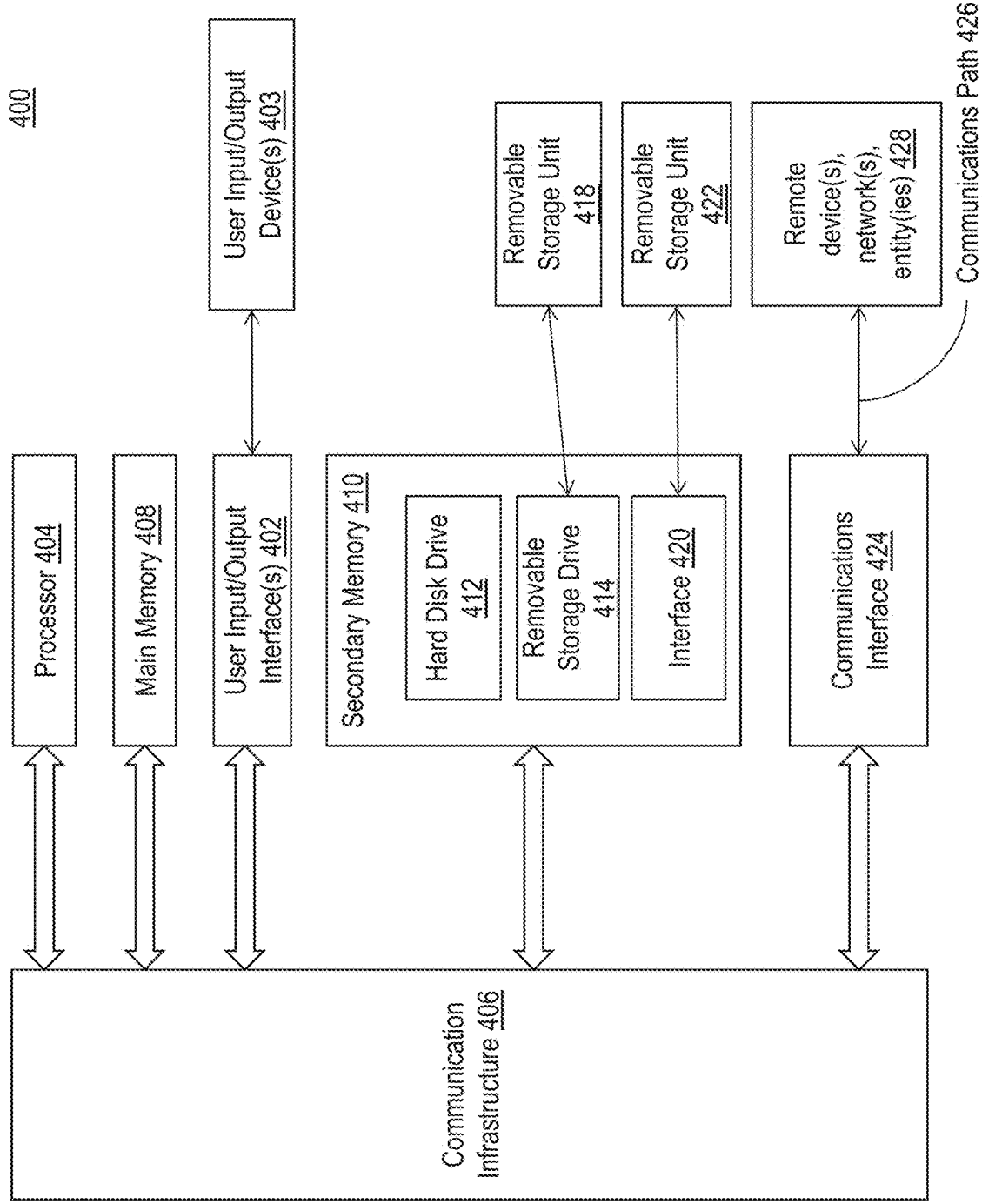
FIG. 4 shows a schematic block diagram of an example computer system in which aspects described may be implemented.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. According to some aspects, the user device 116 of FIG. 1 (and/or any other device/component described herein) may be implemented using the computer system 400. According to some aspects, the computer system 400 may be used to implement method 300 and/or any other methods and/or steps described herein.

Computer system 400 may include one or more processors (also called central processing units, or CPUs), such as a processor 404. Processor 404 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, a tape backup device, and/or any other storage device/drive.

Removable storage drive 414 may interact with a removable storage unit 418. The removable storage unit 418 may include a computer-usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to the removable storage unit 418.

Secondary memory 410 may include other means, devices, components, instrumentalities, and/or other approaches for allowing computer programs and/or other instructions and/or data to be accessed by computer system 400. Such means, devices, components, instrumentalities, and/or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   generating, by one or more computing devices, a first and a second dashboard that each provide a visual representation of respective intelligence information for a firewall identified from raw operational data associated with the firewall;
   mapping, by the one or more computing devices, an identifier of a first data element of the respective intelligence information for the first dashboard to an identifier of a second data element of the respective intelligence information for the second dashboard based on a correspondence between the first data element and the second data element;

receiving a selection of the first data element and a selection of a menu item; and displaying, by the one or more computing devices, an indicator element that indicates correspondence between the first data element and the second data element based on the mapping and the selected menu item, wherein the indicator element is displayed as an overlay of at least a portion of the first dashboard and at least a portion of the second dashboard.

2. The method of claim 1, wherein the mapping the identifier of the first data element to the identifier of the second data element is responsive to a notification of an event for a resource protected by the firewall and associated with the first dashboard.

3. The method of claim 1, wherein the correspondence between the first data element and the second data element is based on at least one of: a value for the first data element and a value for the second data element, a correspondence between a type of security event for a resource associated with the firewall and a source of the security event, or a correspondence between a type of the resource and a type of event for the resource.

4. The method of claim 1, further comprising displaying, based on the identifier of the second data element mapped to an identifier of a third data element of the respective intelligence information for a third dashboard, a guidance indicator that indicates an order to access respective values of the first dashboard, the second dashboard, and the third dashboard.

5. The method of claim 1, further comprising adjusting, based on a change in position for at least one of the first dashboard or the second dashboard, a position of at least a portion of the indicator element to correspond to the changed position of at least one of the first dashboard or the second dashboard.

6. The method of claim 1, wherein the generating the first dashboard and the second dashboard further comprises:
receiving, based on the raw operational data input into a predictive model trained to identify types of dashboards from raw data, an indication of one or more types of dashboards for the raw operational data; and
generating, based at least in part on one or more portions of the raw operational data transformed to respective formats for the one or more types of dashboards indicated by the predictive model, the first dashboard and the second dashboard.

7. The method of claim 1, wherein the firewall comprises at least one of a web application firewall, a proxy firewall, or a virtual private network (VPN) firewall.

8. A system comprising:
a memory; and
at least one processor coupled to the memory and configured to perform operations comprising:
generating a first and a second dashboard that each provide a visual representation of respective intelligence information for a firewall identified from raw operational data associated with the firewall;
mapping an identifier of a first data element of the respective intelligence information for the first dashboard to an identifier of a second data element of the respective intelligence information for the second dashboard based on a correspondence between the first data element and the second data element;

receiving a selection of the first data element and a selection of a menu item; and displaying an indicator element that indicates correspondence between the first data element and the second data element based on the mapping and the selected menu item, wherein the indicator element is displayed as an overlay of at least a portion of the first dashboard and at least a portion of the second dashboard.

9. The system of claim 8, wherein the mapping the identifier of the first data element to the identifier of the second data element is responsive to a notification of an event for a resource protected by the firewall and associated with the first dashboard.

10. The system of claim 8, wherein the correspondence between the first data element and the second data element is based on at least one of: a value for the first data element and a value for the second data element, a correspondence between a type of security event for a resource associated with the firewall and a source of the security event, or a correspondence between a type of the resource and a type of event for the resource.

11. The system of claim 8, the operations further comprising displaying, based on the identifier of the second data element mapped to an identifier of a third data element of the respective intelligence information for a third dashboard, a guidance indicator that indicates an order to access respective values of the first dashboard, the second dashboard, and the third dashboard.

12. The system of claim 8, the operations further comprising adjusting, based on a change in position for at least one of the first dashboard or the second dashboard, a position of at least a portion of the indicator element to correspond to the changed position of at least one of the first dashboard or the second dashboard.

13. The system of claim 8, wherein the generating the first dashboard and the second dashboard further comprises:
receiving, based on the raw operational data input into a predictive model trained to identify types of dashboards from raw data, an indication of one or more types of dashboards for the raw operational data; and
generating, based at least in part on one or more portions of the raw operational data transformed to respective formats for the one or more types of dashboards indicated by the predictive model, the first dashboard and the second dashboard.

14. The system of claim 8, wherein the firewall comprises at least one of a web application firewall, a proxy firewall, or a virtual private network (VPN) firewall.

15. A non-transitory computer-readable medium having instructions stored thereon that, when executed by at least one computing device, cause the at least one computing device to perform operations comprising:
generating a first and a second dashboard that each provide a visual representation of respective intelligence information for a firewall identified from raw operational data associated with the firewall;
mapping an identifier of a first data element of the respective intelligence information for the first dashboard to an identifier of a second data element of the respective intelligence information for the second dashboard based on a correspondence between the first data element and the second data element;

receiving a selection of the first data element and a selection of a menu item; and displaying an indicator element that indicates correspondence between the first data element and the second data element based on the mapping and the selected menu item, wherein the indicator element is displayed as an overlay of at least a portion of the first dashboard and at least a portion of the second dashboard.

16. The non-transitory computer-readable medium of claim 15, wherein the mapping the identifier of the first data element to the identifier of the second data element is responsive to a notification of an event for a resource protected by the firewall and associated with the first dashboard.

17. The non-transitory computer-readable medium of claim 15, wherein the correspondence between the first data element and the second data element is based on at least one of: a value for the first data element and a value for the second data element, a correspondence between a type of security event for a resource associated with the firewall and a source of the security event, or a correspondence between a type of the resource and a type of event for the resource.

18. The non-transitory computer-readable medium of claim 15, the operations further comprising displaying, based on the identifier of the second data element mapped to an identifier of a third data element of the respective intelligence information for a third dashboard, a guidance indicator that indicates an order to access respective values of the first dashboard, the second dashboard, and the third dashboard.

19. The non-transitory computer-readable medium of claim 15, the operations further comprising adjusting, based on a change in position for at least one of the first dashboard or the second dashboard, a position of at least a portion of the indicator element to correspond to the changed position of at least one of the first dashboard or the second dashboard.

20. The non-transitory computer-readable medium of claim 15, wherein the generating the first dashboard and the second dashboard further comprises:

receiving, based on the raw operational data input into a predictive model trained to identify types of dashboards from raw data, an indication of one or more types of dashboards for the raw operational data; and generating, based at least in part on one or more portions of the raw operational data transformed to respective formats for the one or more types of dashboards indicated by the predictive model, the first dashboard and the second dashboard.

\* \* \* \* \*